US006842760B1

(12) United States Patent
Dorgan et al.

(10) Patent No.: US 6,842,760 B1
(45) Date of Patent: Jan. 11, 2005

(54) METHODS AND APPARATA FOR HIGHLY AUTOMATED QUALITY ASSURANCE OF BUILDING CONSTRUCTION PROJECTS

(76) Inventors: Chad Barry Dorgan, 6038 Lynbrook La., Madison, WI (US) 53719; Charles Edward Dorgan, 305 Valley View St., Verona, WI (US) 53593

( * ) Notice: Subject to any disclaimer, the term of this patent is extended or adjusted under 35 U.S.C. 154(b) by 329 days.

(21) Appl. No.: 09/848,110

(22) Filed: May 3, 2001

Related U.S. Application Data

(60) Provisional application No. 60/201,454, filed on May 3, 2000.

(51) Int. Cl.$^7$ ............................................. G06F 17/30
(52) U.S. Cl. ......................... 707/104.1; 705/8; 705/9; 705/11; 700/100
(58) Field of Search ...................... 707/109.1; 700/100; 705/7, 8, 9, 11

(56) References Cited

U.S. PATENT DOCUMENTS

| | | | |
|---|---|---|---|
| 3,736,409 A | 5/1973 | Boyan | |
| 4,019,027 A | 4/1977 | Kelley | |
| 4,700,318 A | 10/1987 | Ockman | |
| 4,875,162 A | 10/1989 | Ferriter et al. | |
| 4,964,060 A | 10/1990 | Hartsog | |
| 5,016,170 A | 5/1991 | Pollalis et al. | |
| 5,189,606 A | 2/1993 | Burns et al. | |
| 5,311,438 A | 5/1994 | Sellers et al. | |
| 5,398,336 A | 3/1995 | Tantry et al. | |
| 5,414,843 A | 5/1995 | Nakamura et al. | |
| 5,461,570 A | 10/1995 | Wang et al. | |
| 5,644,493 A | 7/1997 | Motai et al. | |
| 5,655,118 A | 8/1997 | Heindel et al. | |
| 5,761,674 A | 6/1998 | Ito | |
| 5,856,931 A | 1/1999 | McCasland | |
| 5,950,206 A | 9/1999 | Krause | |
| 6,282,514 B1 * | 8/2001 | Kumashiro | 705/7 |

OTHER PUBLICATIONS

Hyun et al., "WorkPlan: Constraint-based Database for Work Package Scheduling", Journal of Construction Engineering & Management: May/Jun. 1999, pp. 151–161.*
Finch et al., "Auto–Id Application in Construction", Construction Management & Economics, Mar. 1996, pp. 121–130.*
Alkass et al., "Computer Aided Construction Delay Analysis and Claims preparation", Construction Mangement & Economics Jul.1995, pp. 335–352.*
Gates et al., "Projcon: an expert system for project controls in construction management", Proceeding of the $3^{rd}$ international conference on Industrial and Engineering applications of AI and Expert System, 1990, pp. 300–308.*

* cited by examiner

Primary Examiner—Srirama Channavajjala
Assistant Examiner—Khanh B. Pham
(74) Attorney, Agent, or Firm—Craig A. Fieschko, Esq.; DeWitt Ross & Stevens S.C.

(57) ABSTRACT

Tracking forms allow tracking of the completion status and implemented quality standards of a building construction project. A tracking form is prepared for one or more tasks requiring completion at the construction site. Each task is assigned two components on its tracking form: a quality control indicator form, which contains one or more quality control indicators indicating whether certain quality standards are met; and a completion indicator, which indicates the completion status of a task. The completion status may be a discrete binary value, or may instead be a continuous value. Preferably, the workers performing the tasks complete each task's quality control indicator form and completion indicator during design and construction as milestones relating to the task are completed, or at the end of some predetermined time period. The completion indicators relating to the tasks are logged so that the completion status of the project may be monitored, and the information recorded on the quality control indicator forms may be sampled and checked to verify that construction quality standards are being met.

20 Claims, 11 Drawing Sheets

FIG. 1

Parallel Fan Powered VAV Terminal w/ heat Delivery Book

| MODEL VERIFICATION | | Unit Tag (FPVAV) |
|---|---|---|
| | | VAV A-4 |
| 1. Manufacturer | Submitted | |
| | Delivered | |
| 2. Model Number | Submitted | |
| | Delivered | |
| 3. Max/Min Airflow (cfm) | Submitted | / |
| | Delivered | / |
| 4. Serial Number | Submitted | N/A |
| | Delivered | |
| 5. Inlet Diameter, inches | Submitted | |
| | Delivered | |
| 6. Heating MBH/gpm | Submitted | / |
| | Delivered | / |
| 7. Fan Power/Speed, (hp/rpm) | Submitted | / |
| | Delivered | / |
| 8. Total Static Pressure, in w.g. | Submitted | |
| | Delivered | |
| PHYSICAL CHECKS | | |
| 1. The box is free of physical damage | | yes / no |
| 2. The air openings to the box are sealed with durable plastic | | yes / no |
| 3. The airflow sensing tubing is plugged | | yes / no |
| 4. The local electrical disconnect is in the proper location | | yes / no |
| PHYSICAL CHECKS | | |
| 5. The enclosure for the DDC control panel is in the proper location | | yes / no |
| 6. The grommets for the airflow sensing tubing are secure | | yes / no |
| 7. Unit tags affixed | | yes / no |
| 8. Manufacturer's ratings readable/accurate | | yes / no |
| Tracking Cards | | |
| 1. Pull the Appropriate Tracking Card Labeled ——> | | VAV A-4 |

| "No" Responses: | Item | Reason for "No" | | Item |
|---|---|---|---|---|
| | | | | |
| | | | | |

FIG. 2

Parallel Fan Powered VAV Terminal w/ heat # _____ [Fill in Tag #]

Hanging

[fill in box number]

Instructions: Step 1: Circle Yes or No, or fill in with requested information.
Step 2: Explain all "No" responses at the bottom of the card.
Step 3: Attach bar code sticker from equipment when finished, return card to your Field Supervisor.

| Item | | Response | |
|---|---|---|---|
| 1 | Unit identification tag easily visible | Yes | No |
| 2 | Unit is individually supported from structure and not from adjacent ductwork | Yes | No |
| 3 | Adequate clearance around control box fro maintenance | Yes | No |
| 4 | Clear access below box to remove bottom access panel for easy maintenance | Yes | No |
| 5 | Metal to metal connections eliminated to prevent noise problems | Yes | No |
| 6 | All shipping and intallation materials are removed | Yes | No |
| 7 | Box openings temporarily sealed to maintain system cleanliness | Yes | No |

"No" Responses

| Item | Reason for "No" |
|---|---|
| | |
| | |
| | |
| | |

Place Sticker Here

FIG. 3

Parallel Fan Powered VAV Terminal w/ heat # _____ [Fill in Tag #]

Connecting Ductwork

[fill in box number]

Instructions: Step 1: Circle Yes or No, or fill in with requested information.
Step 2: Explain all "No" responses at the bottom of the card.
Step 3: Attach bar code sticker from equipment when finished, return card to your Field Supervisor.

| Item | | Response | |
|---|---|---|---|
| 1 | Balancing damper present on inlet duct | Yes | No |
| 2 | 1 1/2 diameters of straight ductwork installed prior to VAV box damper | Yes | No |
| 3 | Ductwork free of transitions for at least 36" | Yes | No |
| 4 | Maintainable items (actuators, dampers, sensors, etc.) are accessible for easy maintenance | Yes | No |
| 5 | Flexible connector (vibration isolator) installed on inlet duct to avoid noise problems from metal to metal contact | Yes | No |
| 6 | Flex duct is installed in a way that avoids formind kinks on both inlet and outlet ductwork | Yes | No |

"No" Responses

| Item | Reason for "No" |
|---|---|
| | |
| | |
| | |
| | |

Place Sticker Here

FIG. 4

Parallel Fan Powered VAV Terminal w/ heat # _____ [Fill in Tag #]

Piping Installation

[fill in box number]

Instructions: Step 1: Circle Yes or No, or fill in with requested information.
Step 2: Explain all "No" responses at the bottom of the card.
Step 3: Attach bar code sticker from equipment when finished, return card to your Field Supervisor.

| Item | | Response | |
|---|---|---|---|
| | | Yes | No |
| 1 | Piping is fully supported | Yes | No |
| 2 | Control valve and maintainable items are accessible | Yes | No |
| 3 | The following components are installed, from supply line to return line: | Yes | No |
| 4 | Ball valve | | |
| 5 | Union-Coil-Union | | |
| 6 | Manual air vent | | |
| 7 | Pete's Plug | | |
| 8 | 2-way automatic control valve | | |
| 9 | Manual drain valve | | |
| 10 | Manual flow meter valve | | |

"No" Responses

| Item | Reason for "No" |
|---|---|
| | |
| | |
| | |

Place Sticker Here

FIG. 5

Parallel Fan Powered VAV Terminal w/ heat # _____ [Fill in Tag #]

Controls Installation

[fill in box number]

Instructions: Step 1: Circle Yes or No, or fill in with requested information.
Step 2: Explain all "No" responses at the bottom of the card.
Step 3: Attach bar code sticker from equipment when finished, return card to your Field Supervisor.

| Item | | Response | |
|---|---|---|---|
| 1 | Point-to-point connections of control wiring verified | Yes | No |
| 2 | Temperature sensor calibration verified | Yes | No |
| 3 | Central system accurately represents conditions of VAV box | Yes | No |

"No" Responses

| Item | Reason for "No" |
|---|---|
| | |
| | |
| | |

Place Sticker Here

FIG. 6

| Parallel Fan Powered VAV Terminal w/ heat # _____ [Fill in Tag #] |
| Electrical |
| [fill in box number] |

Instructions: Step 1: Circle Yes or No, or fill in with requested information.
Step 2: Explain all "No" responses at the bottom of the card.
Step 3: Attach bar code sticker from equipment when finished, return card to your Field Supervisor.

| Item | | Response | |
|---|---|---|---|
| 1 | Local disconnect installed in accessible location | Yes | No |
| 2 | Variable speed selector switch is operational | Yes | No |
| 3 | Motor rotation in proper direction | Yes | No |
| 4 | P.E. switch is operational | Yes | No |

"No" Responses

| Item | Reason for "No" |
|---|---|
|  |  |
|  |  |
|  |  |

Place Sticker Here

FIG. 7

Parallel Fan Powered VAV Terminal w/ heat Contractor Book

| Controls Start-up | VAV A-4 |
|---|---|
| 1. Cooling/heating (when present) sequence of control correct | yes / no |
| 2. Warm-up/cool-down sequence of control correct | yes / no |
| 3. Unoccupied sequence of control correct | yes / no |

"No" Responses:

| Item | Reason for "No" | Item |
|---|---|---|
| | | |
| | | |

Place Sticker Here

FIG. 8

Parallel Fan Powered VAV Terminal w/ heat Contractor Book

| TAB | VAV A-4 |
|---|---|
| 1. Modifying unit/system settings through temperature sensor working | yes / no |
| 2. Airflow sensor calibration verified | yes / no |
| 3. Minimum airflow, cfm (design/measured) | / |
| 4. Maximum airflow, cfm (design/measured) | / |

"No" Responses:

| Item | Reason for "No" |
|---|---|
| | |
| | |

Place Sticker Here

FIG. 9

| VAV Terminal w/ heat<br>VAV A-4<br>Controls Start-up | VAV Terminal w/ heat<br>VAV A-4<br>TAB | VAV Terminal w/ heat<br>VAV A-4<br>Delivery Book |
|---|---|---|
| VAV Terminal w/ heat<br>VAV A-4<br>Hanging | VAV Terminal w/ heat<br>VAV A-4<br>Connecting Ductwork | VAV Terminal w/ heat<br>VAV A-4<br>Piping Installation |
| VAV Terminal w/ heat<br>VAV A-4<br>Controls Installation | VAV Terminal w/ heat<br>VAV A-4<br>Electrical | |

FIG. 10

Piping Installation
Date: _____
[fill in current date]

Instructions: Step 1: Circle Yes or No, or fill in with requested information.
Step 2: Explain all "No" responses at the bottom of the card.
Step 3: Describe work completed today and return card to your Field Supervisor.

| Item | Task Description | Response | |
|---|---|---|---|
| 1 | Piping is clean and free of damage prior to installation | Yes | No |
| 2 | Maximum support spacing is according to table on back, or closer as necessary | Yes | No |
| 3 | All connections meet specification requirements | Yes | No |
| 4 | All equipment requiring maintenance is accessible (valves, junction boxes, etc.) | Yes | No |
| 5 | All pipe openings temporary sealed to maintain duct system cleanliness | Yes | No |
| 6 | Record drawings have been updated to reflect any changes made | Yes | No |

"No" Responses

| Item | Reason for "No" |
|---|---|
| | |
| | |
| | |

Briefly Detail Work Completed Today
_____
_____
_____

FIG. 11

Ductwork Installation
Date: _____
[fill in current date]

Instructions: Step 1: Circle Yes or No, or fill in with requested information.
Step 2: Explain all "No" responses at the bottom of the card.
Step 3: Describe work completed today and return card to your Field Supervisor.

| Item | Task Description | Response | |
|---|---|---|---|
| 1 | Ductwork is clean and free of damage prior to installation | Yes | No |
| 2 | There are supports every 6 feet, or less as required | Yes | No |
| 3 | All latitudinal and longitudinal joints are sealed (<1% leakage required) | Yes | No |
| 4 | All equipment requiring maintenance is accessible (valves, junction boxes, etc.) | Yes | No |
| 5 | All duct openings temporary sealed to maintain duct system cleanliness | Yes | No |
| 6 | Record drawings have been updated to reflect any changes made | Yes | No |

"No" Responses

| Item | Reason for "No" |
|---|---|
| | |
| | |
| | |

Briefly Detail Work Completed Today
_____
_____
_____

FIG. 12

VAV Terminal Construction Checklist
XYZ Corporate Headquarters
Equipment Number: VAV A-1

1) Model Verification

| A | Data to Verify: | Specified | Submitted | Installed |
|---|---|---|---|---|
| | Manufacturer | | | |
| | Model | | | |
| | CFM (Max/Min) | / | / | / |
| | Serial Number | | | |
| | Inlet Diameter, inches | | | |
| | Heating MBH/gpm | | | |
| | Fan Power, hp | | | |
| | Total Static Pressure, psig | | | |

2) Pre-Installation Checks
The following must be completed upon delivery of equipment to the work-site.

| | | Contractor | Initials | |
|---|---|---|---|---|
| A | Physical Checks | Mechanical | | |
| | There is no physical damage to the box | yes / no | | |
| | The air openings to the box are sealed with durable plastic | yes / no | - | |
| | The airflow sensing tubing is plugged | yes / no | | |
| | The local disconnect is in the proper location | yes / no | | |
| | The enclosure for the DDC control panel is in the proper location | yes / no | | |
| | The grommets for the airflow sensing tubing are secure | yes / no | | |
| | Unit tags affixed | yes / no | | |
| B | Component Verification | Mechanical | | |
| | Manufacturer's ratings are readable | yes / no | | |
| | Manufacturer's ratings are accurate | yes / no | | |

FIG. 13

3) Physical Installation Checks
The following items need to be verified during installation. Fill in blanks with a checkmark, specific information, or circle "yes" or "no". For any negative responses, complete section 4.

|   |   | Contractor | Initials |   |
|---|---|---|---|---|
| A | Hanging of Box | Mechanical |   |   |
|   | Unit, damper, and air valve tags affixed | yes / no |   |   |
|   | Unit secured as required in specifications | yes / no |   |   |
|   | Adequate clearance around controls for O&M |   |   |   |
|   | 6" clearance in front of air valve for travel of inner valve rod | yes / no |   |   |
|   | 1 1/2 duct diameters before the air valve | yes / no |   |   |
|   | No duct transitions upstream of box for 30" | yes / no |   |   |
|   | No obstructions below box to remove bottom access panel | yes / no |   |   |
|   | Vibration isolators in good condition | yes / no |   |   |
|   | No metal to metal connections to cause noise problems | yes / no |   |   |
|   | Box properly labeled (box tag easy to see) | yes / no |   |   |
| B | Ductwork - Primary Air Inlet | Mechanical |   |   |
|   | Primary ductwork all hard or maximum flex duct length of 1 foot | yes / no |   |   |
|   | All inlet elbows long radius and no kinks in flex duct | yes / no |   |   |
|   | 1 1/2 duct diameters prior to air valve | yes / no |   |   |
|   | No transitions upstream for at least 36" | yes / no |   |   |
|   | Record drawings accurate | yes / no |   |   |
|   | Vibration isolator if flex duct is not used | yes / no |   |   |
|   | Does not interfere with accessibility | yes / no |   |   |
| C | Ductwork - Outlet | Mechanical |   |   |
|   | Vibration isolator in place with no holes | yes / no |   |   |
|   | No kinks in flex duct | yes / no | . |   |
|   | Record drawings accurate | yes / no |   |   |
| D | Controls | Controls |   |   |
|   | Control wiring hooked up | yes / no |   |   |
|   | Temperature sensor hooked up | yes / no |   |   |
|   | Communication with central system | yes / no |   |   |
|   | Temperature sensor calibrated | yes / no |   |   |
|   | Cooling sequence of control correct (should be attached) | yes / no |   |   |
|   | Heating sequence of control correct (should be attached) | yes / no |   |   |
|   | Warm-up sequence of control correct (should be attached) | yes / no |   |   |
|   | Cool down sequence of control correct (should be attached) | yes / no |   |   |
|   | Unoccupied sequence of control correct (should be attached) | yes / no |   |   |

FIG. 14

| E | Testing and Balancing (TAB) | TAB | |
|---|---|---|---|
| | Modifying unit / system settings throughout temperature sensor working | yes / no | |
| | Airflow sensor calibrated | yes / no | |
| | Actual min / max airflow (cfm) | / | |

4) Negative Responses

For each negative response in sections 2 and 3, record the reason and resolution below. Attach extra sheets as necessary.

| A | Item | Reason for Negative Response | Resolution |
|---|---|---|---|
| | | | |
| | | | |
| | | | |
| | | | |
| | | | |
| | | | |

METHODS AND APPARATA FOR HIGHLY AUTOMATED QUALITY ASSURANCE OF BUILDING CONSTRUCTION PROJECTS

CROSS-REFERENCE TO RELATED APPLICATIONS

This application claims priority under 35 USC §119(e) to U.S. Provisional Patent Application 60/201,454 filed 3 May 2000, the entirety of which is incorporated by reference herein.

FIELD OF THE INVENTION

This disclosure concerns an invention relating generally to construction processes, and more specifically to quality assurance and verification processes for building construction projects, including post-construction (i.e., maintenance) operations.

BACKGROUND OF THE INVENTION

Building construction projects (including their planning, design, construction, startup, turnover, and operations phases) are generally managed haphazardly, and are often based only on the expertise or skill of those who are responsible for and managing the various phases. In essence, most building construction projects rely on the discretion of the owner, designers and builders to ensure that all of the project phases are properly and timely completed. It is evident that mere reliance on discretion is insufficient to assure quality as each phase is executed. A survey by the Lawrence Berkeley National Laboratory in 1996 indicates that buildings in the United States have approximately 15% of their components misinstalled (or never installed in the first place), and approximately 40% have control problems such as improperly tuned environmental systems. Additionally, these statistics may underestimate the degree of construction error since many improper or missing installations are never found. Those that are found are difficult to repair or change after installation is complete. Empirical and anecdotal data has indicated that it takes approximately two years after occupancy to identify and fix most building construction problems, and by that time, it may be difficult or impossible to have the building owner get the builders to perform modifications, equipment replacement, control sequence changes and repairs to meet the owner's project requirements. Additionally, the builders or other repair personnel will usually have a more difficult time making repairs because of their diminished familiarity with the project owing to passage of time, as well as the fact that the building is in service.

Several methods have been used to help ensure that construction projects were being delivered per the specifications of construction design documents and/or per project or contractual needs, and these methods may be applied to construction projects that are done by either an independent contractor or in-house personnel. Monitoring of in-house projects is especially typical at industrial plants; among real estate owners, developers, and managers of commercial property; large retail organizations; and in large commercial and governmental organizations. In almost all cases, quality assurance is related to performing inspections and testing at the end of the project. For example, when large components or systems have undergone complete installation, they are commonly tested to determine if they are operable. As another example, inspection "walk-throughs" by senior skilled personnel are common in construction projects to see whether construction is proceeding properly. However, these methods are generally focused on "absolute" functionality: whether the installation works in an absolute sense, rather than whether it functions as per the building owner's project intent (i.e., the building owner's project requirements, expectations, and desires, as discussed later). Further, they generally rely on a subjective opinion or superficial appearance of functionality, rather than on an objective or statistical quality assessment. Additionally, these methods are generally implemented only at the installation/construction phase, and are not extended to all phases of construction project delivery, including planning, design and operations phases. These methods are also problematic in that they assume that any error can be detected and corrected at any stage, especially the late construction stage of the delivery process. However, this is not true for most aspects of planning, design and construction, since many errors are as a practical matter uncorrectable once initiated, or are at least highly unfeasible to correct in terms of cost, reconstruction, and/or manpower. Further, while high quality should be provided if 100% inspection is provided on a regular basis as construction proceeds, it has been well documented that 100% review is not achievable within reasonable cost and time. Thus, most quality practice and research has been focused on determining an acceptable balance between low review of many items versus accurate review of a few items, with the balance being struck by statistical sampling methods.

The desire for successful delivery of construction projects has led to the implementation of many new quality assurance methods, including assigned project managers; construction management; Agency Construction Management; teaming; testing and balancing contractor; destructive and non-destructive testing; performance testing; critical path management; value engineering; construction quality control; automated data management, and other related methods. In addition, the use of the "sole responsibility" approach to project delivery—i.e., assigning responsibility for certain tasks or construction phases to a single person, contractor, or other entity—has been implemented to reduce conflicts between planning, design, and construction. The sole responsibility concept, while seemingly simplistic, should theoretically enhance quality over the traditional "shared responsibility" concept of construction since each party's role is more clearly defined, and responsibility is centralized in identified parties who will therefore have a greater incentive to ensure quality. Sole responsibility has been implemented by methods such as design-build project delivery and performance contracting, wherein the quality assurance responsibility is transferred to the design-build contractor or performance contractor. However, since these parties use the same quality assurance methods used by other construction projects, and since they frequently have an internal division of responsibility under one overall management responsibility, implementation of the sole responsibility concept generally results in only a moderate advance in quality. In essence, while the theory of sole responsibility seems simple and straightforwardly implemented, in practice it is difficult to apply and it does not resolve unsatisfactory problem resolution. The same applies to "teaming", where there are still a number of team members to blame when the delivered construction project does not work or falls short of the project owner's expectations.

As an extension of the foregoing concepts, recent years have seen owners and those responsible for improving the delivered quality of construction projects implement a commissioning process which assigns a single entity to manage quality assurance and verification of the owner's project requirements and/or project intent at all phases of the project delivery. The entity or person managing this process is typically known as a "commissioning authority" or "commissioning agent." In cases where the process is identified as something other than the commissioning process, the managing entity might be identified by different names, usually something like "construction quality manager." In essence, the managing entity serves as a representative of the building owner to see that the construction project is efficiently and cost-effectively carried out as per the owner's project intent. The managing entity or commissioning authority reviews the construction project during all phases, and reviews the work done by planning, design, construction and operations personnel, often with the assistance of a checklist and/or the construction plans to see that the construction process is running smoothly. Frequently on large projects the commissioning authority is a number of people lead by a designated "owner's commissioning authority". This process has improved quality assurance, but it still lacks the ability to effectively implement quality control using statistical tools, largely because it does not accomplish continuous and full knowledge of the current status of the project, nor does it implement objective and unbiased methods of evaluating the current quality of the project.

As previously noted, another flaw with prior quality assurance methods is that they tend to focus on absolute operability (i.e., meeting identified project specifications), rather than on the owner's project intent. Project intent extends beyond building specifications to the underlying issue of the functionality of the building for its intended purpose. To illustrate, the project intent of a school is (broadly) to enhance learning, whereas the project intent of an office building is to enhance productivity; thus, each building may have different demands in terms of lighting, noise, number and accessibility of electrical/data/water outlets, fire/safety egress, etc. Project intent therefore includes items such as space, comfort, safety, productivity desires, costs, aesthetics, sustainability, flexibility, indoor air quality, image, operating costs, energy efficiency, and other functional needs that the user or owner may have of the building. As examples, an owner of a school building may have elements of project intent such as no change orders during construction; no changes in the first year of operations; or student learning 10% higher than the average of existing schools after the building is placed in operation. Some of these elements may not be closely correlated with the building design, but they are the in owner's needs and goals that should be addressed in planning and design if they are to be achieved. Unfortunately, since the expectations of owners are difficult to identify and document as opposed to more "tangible" physical building specifications, most design and construction efforts take no or minimal account of project intent. This is problematic and expensive because later correction/modification of the constructed project to meet project intent, as well as the continued maintenance required to compensate for these problems, adds significantly to the costs of initial construction and later upkeep.

Construction costs are also enhanced by the disorderly way in which construction progresses. In general, it is difficult to run construction tasks in parallel with each other in any specific area of a construction project, for example, for one contractor to install piping in one area of a building simultaneously with another contractor installing the ductwork in the same area. Thus, construction teams usually handle tasks sequentially, with one team moving in to install certain components once the prior team has completed installation of other components. However, since some teams may not (or may not be able to) efficiently handle installation—as by installing components with the intent of freeing certain areas of the project for work by other teams as soon as possible—the construction project may be dramatically slowed by "bottlenecks" in the construction process. This also has a significant impact on construction costs since some construction teams and/or contractors may need to sit idle until prior teams have completed their tasks. This timing problem has been an issue of significant concern among owners, construction managers, engineers and architects for many years, and its ramifications are reflected by United States Department of Commerce data indicating that the AEC (architectural, engineering and construction) industry has had a 16% reduction in productivity between 1970 and 2000, while manufacturing has had a 89% increase in productivity in the same period in the United States. Prior patents dealing with construction task scheduling or related subjects are exemplified by U.S. Pat. No. 5,016,170 to Pollalis et al., U.S. Pat. No. 5,761,674 to Ito, U.S. Pat. No. 4,019,027 to Kelley, and U.S. Pat. No. 4,700,318 to Ockman. U.S. Pat. No. 5,189,606 to Burns et al. and U.S. Pat. No. 5,950,206 to Krause are also of interest. Unfortunately, these prior "construction schedules" and other manual methods for tracking the completion of construction can be time-intensive and costly to complete, subject to error, and difficult to adapt to projects which vary from a "standard" project for which the method was originally adapted.

SUMMARY OF THE INVENTION

The invention involves methods and apparata which are intended to at least partially solve the aforementioned problems. To give the reader a basic understanding of some of the advantageous features of the invention, following is a brief summary of preferred versions of the methods used by the invention. As this is merely a summary, it should be understood that more details regarding the preferred versions may be found in the Detailed Description set forth elsewhere in this document. The claims set forth at the end of this document then define the various versions of the invention in which exclusive rights are secured.

In an exemplary preferred version of the invention, the progress of a construction project and its conformity to predetermined quality assurance standards is detailed by use of tracking forms. These are used to verify, track and record that the constructed project is meeting the requirements set forth in the construction documents, and those implied by the owner's project intent. These tracking forms allow tracking of a construction project, i.e., one or more of the construction phases of planning, design, construction, startup, turnover, and operations. A tracking form is prepared for one or more tasks requiring completion during the foregoing phases; as an example, the delivery and model verification of a variable air volume (VAV) box, its various installation tasks, its controls start-up, and its tuning could all be treated as separate tasks on separate tracking forms, or could instead be combined as separate tasks on a single tracking form. Each task is assigned two components on its tracking form: a quality control indicator form, which contains one or more quality control indicators indicating whether certain quality standards are met; and a completion indicator, which indicates the completion status of a task. The completion status may be a discrete binary value (i.e., either completed or incomplete), or may instead be a continuous value (e.g., a percentage value of completion, or a description of the work done towards completing the overall task). Preferably, the workers performing the tasks complete each task's quality control indicator form and completion indicator during design and construction as milestones relating to the task are completed (e.g., when the task is completed), or at the end of some predetermined time period (such as one day of worktime).

The tracking forms may be constructed by determining the tasks of importance that need to be completed during some or all phases of a building construction project. The quality standards for completion of each task are then determined and are set forth on a quality control indicator form for that task (as illustrated by FIGS. 1–8, wherein a variety of quality control indicator forms for various tasks are illustrated). Each task is also assigned a completion indicator such as the completion indicator stickers of FIG. 9 or the completion indicator card of FIG. 15. These exemplary completion indicators bear machine-readable indicia which encode information reporting the completion of their tasks, so that completion of a task can be recorded by merely scanning/reading the indicia of the completion indicator. Different completion indicators are exemplified by the tracking forms of FIGS. 10–11, wherein the completion status of certain indicated tasks is recorded as a continuous value ranging between incomplete and completed. Spaces for recording the continuous completion status are provided directly on the quality control indicator forms for these tasks.

As each task is later performed, its quality control indicator form is completed by verifying whether the task's listed quality standards are met (and preferably recording that the standards are met, or the reasons why they are not met, on the quality control indicator form). Additionally, the completion status of the task is recorded using the task's completion indicator. To illustrate, for the completion indicator stickers of FIG. 9, completion is preferably recorded after adhering the completion indicator sticker to its corresponding quality control indicator form and turning the quality control indicator form in to a central recordation authority. The recordation authority may scan the indicia to record task completion, thereby allowing determination of which of the project's tasks are done and which are yet to be completed (and thus allowing better scheduling of future tasks). The recordation authority may also sample the quality control indicator forms and review the quality standard verification information thereon to determine the quality status of the project.

The invention provides an effective implementation of a new quality process in the construction industry. The invention is not "glorified startup" or over-documentation of the construction process, but is a new way to develop, design, construct, and operate facilities with cost-effective effort and quality assurance verification. When the statistics discussed in this document are considered, it should be realized that the construction industry has serious problems with delivering buildings on time, within budget, and in accordance with the owner's project intent, and that the need for later maintenance and upkeep owing to mistakes made during the construction process can generate significant economic drain. Faulty construction can also hinder the later productivity of those who work within the buildings, giving rise to further waste. The invention addresses the significant and longstanding need for methods of identifying and avoiding construction problems, and helps to significantly reduce the aforementioned problems.

The invention is useful for the effective implementation of the single responsibility approach for delivery of construction projects, since the worker(s) who perform each task within the project must either complete its tracking form (or that task's section within the tracking form), or have a foreman or other responsible person do so. By concentrating and requiring responsibility in an individual—and by further making this individual the one who is performing the task, rather than a reviewer who did not perform the task and who evaluates the task after it is completed—the ability to collect current and accurate quality data is greatly enhanced. This also allows a way to cost-effectively implement the commissioning process and allow the application of objective statistical methods to evaluate project quality at each phase during construction project delivery.

The tracking forms also allow implementation of quality control methods, as by statistical analysis of the information detailed on the tracking forms, and additionally allow efficient progress tracking, i.e., monitoring of the progress of the construction, indicating whether other crews may move into certain areas to perform subsequent construction, etc. It is well known that 100% inspection of work is not practically applicable in quality control processes, and pursuant to this knowledge, it is not recommended that the quality control indicators of each tracking form be reviewed and verified by supervisory or other personnel in every case, or even that these quality control indicators all be meticulously logged, tracked, and analyzed. Again, the primary responsibility for reviewing and verifying the quality standards reflected by the quality control indicators is left with the personnel responsible for the corresponding task. Instead of 100% monitoring, the data from the quality control indicators may simply be sampled in accordance with any desired statistical methods to verify quality, which allows quality to be accurately monitored while avoiding significant monitoring costs.

The invention is also useful because it allows easier implementation of desired quality control standards for component installation. For many building components, outside of certain building code requirements, there are no accepted "industry standards" relating to the mode and manner of construction. Rather, installers learn construction practices from more experienced personnel, and they in turn pass these practices on to others. Thus, where the learned construction practices are less than optimal, they tend to propagate. By incorporating preferred practices onto the tracking forms, construction personnel are made to "learn" or "re-learn" and follow desired practices.

Further advantages, features, and objects of the invention will be apparent from the following detailed description of the invention in conjunction with the associated drawings.

BRIEF DESCRIPTION OF THE DRAWINGS

FIG. 1 pertains to a first embodiment of an installation tracking form in accordance with the invention, and illustrates a model verification quality control indicator form used for delivery and model verification of a component within a construction project (here a variable air volume box designated VAV-A4).

FIGS. 2–6 illustrate exemplary installation quality control indicator forms used after delivery and model verification of the variable air volume box noted in FIG. 1 and during its installation, wherein FIG. 2 relates to the installation task of hanging the box;

FIG. 3 relates to the installation task of connecting ductwork;

FIG. 4 relates to the installation task of installing piping;

FIG. 5 relates to the installation task of installing controls; and

FIG. 6 relates to the installation task of installing the electrical system.

FIG. 7 illustrates an exemplary start-up quality control indicator form utilized after installation of the variable air volume box noted in FIG. 1 and during its start-up.

FIG. 8 illustrates an exemplary tuning (testing, assessing, and balancing) quality control indicator form used with the variable air volume box noted in FIG. 1 after startup has been completed.

FIG. 9 illustrates an exemplary completion indicator used within the installation tracking form of the previous Figures, with several exemplary completion indicator stickers being shown, each sticker being assigned to a corresponding one of the quality control indicator forms of FIGS. 1–8 upon completion of those forms.

FIGS. 10 and 11 illustrate exemplary alternative embodiments of the installation quality indicator forms of FIGS. 3 and 4, wherein the completion indicator stickers of FIG. 9 are not used. Instead, the completion indicator is provided integrally on the forms in manner such that installation completion status may be recorded as a continuous value (e.g., by describing the work done towards completing the overall task, or recording the percentage value of completion).

FIGS. 12–14 pertain to a second preferred embodiment of an installation tracking form in accordance with the invention, and illustrate successive pages of exemplary quality control indicator forms.

DETAILED DESCRIPTION OF PREFERRED EMBODIMENTS OF THE INVENTION

Figure 15:
FIG. 15 illustrates an exemplary completion indicator card utilized with the quality control indicator forms of FIGS. 12–14, with this particular completion indicator card being used to indicate the completion of the quality control indicator form of task 3D on FIG. 13 (installation of controls).

As previously noted, the invention uses tracking forms, and more specifically the quality control indicators and their corresponding completion indicators therein, to (1) specify, check, and record the desired quality standards for each significant construction task to which a tracking form is assigned; and (2) verify and record the completion status of each such task. For each task, the personnel who are assigned responsibility over the task also have the responsibility of completing the quality control indicators and completion indicators within each tracking form. The tracking forms may take a variety of configurations. A first version is illustrated in FIGS. 1–11, wherein FIGS. 1–8 illustrate quality control indicator forms for "discrete" tasks (delivery/model verification, installation, start-up, and tuning of a VAV box), as well as completion indicator stickers for these tasks (FIG. 9). FIGS. 10 and 11 then illustrate quality control indicator forms for "continuous" tasks (installation of piping, FIG. 10, and installation of ductwork, FIG. 11). The quality control indicator forms and completion indicator stickers of FIGS. 1–11 will now be described in greater detail to provide an introduction to the invention.

Referring initially to FIGS. 1–9, a tracking form for the tasks of (1) delivery and model verification, (2) installation, (3) start-up, and (4) tuning of a VAV box is shown. As will be discussed at greater length later in this document, the various components of the tracking form illustrated in FIGS. 1–9, namely its quality control indicator forms and completion indicator stickers, are constructed from a library of such components after the plans for the construction project are completed. The tracking form is used for quality assurance and installation planning/scheduling in the following manner.

The project of installing the VAV within the building begins when delivery of the VAV box to the construction site (and more particularly to the location of its installation) has been made. Once delivery is accomplished, the tracking form(s) relating to the VAV box are produced and associated with the box. Preferably, the tracking form components are provided as a unit, e.g., collected in an envelope (preferably a clear closable plastic envelope to keep out moisture), which is affixed to the VAV box by the construction supervision team upon delivery of the VAV box to the site. This makes the tracking form readily available to the personnel who will be working on the VAV box after its delivery, and it allows them to complete the quality control indicator form(s) and quality control indicator(s) thereon for later transcription to a centralized database or other means of storing information. The personnel could instead merely record the data directly into the centralized database rather than having it transcribed later, but this might require the personnel to repeatedly return to the centralized database—which may be located at a different area of the construction site—whenever data recordation is to be performed. Additionally, the effectiveness of the tracking form is enhanced where the personnel can use the form during and/or immediately after working on the VAV box, and if personnel must walk across the site to enter the data, some data may be lost or forgotten by the time entry is effected. Thus, later transcription of information from the tracking forms to the centralized database is preferred for sake of convenience and efficiency. However, if the tracking forms are enabled for remote communication with the centralized database by wireless or similar forms of communication, direct recordation should not be problematic.

The model verification quality control indicator form of FIG. 1 is then completed by the personnel who have been assigned responsibility over the VAV box's delivery/receipt and/or on-site placement. Upon delivery of a component to a construction site, it is necessary to confirm that the component is indeed the one that was ordered, that it has been received in good shape, that it is appropriately routed to its place of installation, and so forth. One of the purposes of the model verification quality control indicator form is to account for these matters. Initially, details regarding the characteristics of the VAV box are filled in on the model verification quality control indicator form in accordance with the shipping/packing information accompanying the VAV box. In FIG. 1, the model verification quality control indicator form is shown in an uncompleted (not filled in) state save for entry of the particular name assigned to the VAV box at the construction site, in this case "VAV A-4".

Apart from verification of the appropriateness of VAV box characteristics for the installation location in question, suitable physical checks are performed to verify that the VAV box is appropriate for installation at its assigned location. Preferably, the model verification quality control indicator form is organized so that if all physical check queries are affirmative ("yes" answers are given), this will indicate that the VAV box has been delivered in suitable condition, is appropriately configured for installation at the designated location, and is apparently ready to install. If a negative answer is given, this indicates to the installing personnel that closer examination should be made of the VAV box; for example, if it appears damaged, or if it appears that the wrong VAV box was inadvertently ordered, the installing personnel may need to examine possible remedies or order a new VAV box. The model verification quality control indicator form includes spaces at the bottom of the form wherein an installer may indicate the reasons for any negative answers. The form is not intended to avoid all potential problems that may arise from the VAV box's installation; rather, the objective of the form is to have the installer examine the component in a complete and orderly fashion so that most common problems with subsequent component installation—e.g., installation of a wrong or damaged component—might be noticed prior to installation.

When completing the model verification quality control indicator form, if the installer comes to the conclusion the VAV box is wholly inappropriate for installation, the installer may stop and contact the construction supervisor for instructions as to how to proceed. On the other hand, if the VAV box appears generally suitable—if it has all affirmative answers, or if non-critical negative answers are indicated—the installer may simply complete the form. As a penultimate step, the model verification quality control indicator form indicates to the installer that "tracking cards"—i.e., installation quality control indicator forms—should be obtained prior to beginning installation.

Once the model verification quality control indicator form is completed and the installation quality control indicator forms are obtained, the installer peels off the model verification completion indicator sticker (labeled "Delivery Book") from the completion indicator sticker sheet of FIG. 9, and affixes it to the model verification quality control indicator form of FIG. 1. The model verification completion indicator sticker may be adhered to the back of the model verification quality control indicator form, or to another area of the model verification quality control indicator form where the sticker will not obstruct information set forth thereon.

The model verification quality control indicator form is then turned in to the construction supervisor. The construction supervisor may then record the return of the model verification quality control indicator form to indicate that the delivery and acceptance of the VAV box has been completed. Alternatively, responsibility for recordation may be assigned to the installer rather than to a supervisor. Such recordation may be on a manual or computerized construction planning database, e.g., on a written construction planning chart or in a computerized construction planning database. The model verification completion indicator sticker from the completion indicator sticker sheet of FIG. 9 bears machine-readable indicia (a bar code) which is particularly suitable for automated or semi-automated machine entry of the completion status of the model verification task into a computerized construction planning database. This allows the installer or construction supervisor to simply run the model verification quality control indicator form adjacent to a bar code reader to log the completion of the form.

It should be understood that other machine-readable indicia are also possible for use on the completion indicator sticker, such as a magnetic stripe or raised text/figures. It should also be understood that completion indicators may be provided in forms other than stickers and may be provided either integrally with or separately from the quality control indicators; for example; completion indicators may be provided as separate cards bearing machine-readable indicia (to be discussed later), or might even be provided as no more than checkboxes provided directly on quality control indicator forms themselves. However, the use of completion indicator stickers (or other completion indicators) which are provided separately from the quality control indicator forms is particularly preferred, since this arrangement allows standard "form" quality control indicator forms for different tasks and components to be easily generated, and to be used in conjunction with completion indicators which are separately produced and specially coded for ease of tracking and entry. To illustrate, blank model verification quality control indicator forms similar to those of FIG. 1 can be printed in bulk from a form library, and can be used for numerous VAV boxes apart from VAV A-4. Completion indicators for each of these VAV boxes may then be separately generated for use with each form.

After model verification has been completed, the installer then begins installation of the VAV box and sequentially performs the installation tasks associated with the installation quality control indicator forms of FIGS. 2–6: hanging (FIG. 2), connecting ductwork (FIG. 3), piping installation (FIG. 4), controls installation (FIG. 5), and electrical installation (FIG. 6). Each of the quality control indicator forms of FIGS. 2–6 are generic to most VAV boxes and for the specified installation tasks, and thus the installers may simply obtain the generic forms and write in the identification code for the VAV in question (e.g., "VAV A4") to associate the form with the specific component. If desired, the back side of the quality control indicator forms can be used to summarize specifications, best practice information, or requirements from the construction plans. As an example, the piping installation quality control indicator form of FIG. 4 could include on its back side a listing of piping insulation thickness standards to which the installer may conveniently refer during installation. Apart from serving as a convenient reference, the inclusion of such information helps serve as a continuous reminder to the worker of the quality and functional needs for meeting the owner's project requirements and project intent.

As can be seen on each of the forms, various preinstallation and installation checks are set forth whereby the installer performing the task in question for the VAV may indicate whether the desired quality assurance criteria are met or not, with such an indication preferably being provided as a binary value, i.e., yes or no. If one or more "no" answers are indicated, the installer is to indicate the reason for the "no" response. Again, the form is not intended to avoid all potential problems encountered during the VAV box's installation, and is instead intended to have the installer perform installation in an orderly manner with quality in mind; realize when quality assurance standards are being breached; and think of the reasons for such breach and how the breach may be avoided (when possible). If a negative answer is given, the need to record the reason, for the negative answer will induce the installer to consider the reasons for the negative answer, and whether the negative answer may be avoided. If the reasons for the negative answer seem unavoidable, perhaps the negative answer truly is unavoidable, and the installer may simply proceed to the next installation task (and its assigned quality control indicator form). Alternatively, the installer may consult the construction supervisor or others for suggestions and/or instructions as to how to proceed.

Upon completion of an installation task (and of its corresponding quality control indicator form of FIGS. 2–6), the installer performing that task obtains the appropriate installation completion indicator sticker from the completion indicator sticker sheet of FIG. 9, affixes it to the installation quality control indicator form in question, and proceeds to the next installation task (and the next installation quality control indicator form) after logging completion of the form, or turning the completed installation quality control indicator form in to the construction supervisor for logging.

After installation is complete, the installer (or other construction personnel) then proceeds to the tasks associated with the quality control indicator forms of FIGS. 7 and 8:

controls start-up (FIG. 7) and testing, adjusting, and balancing (often abbreviated TAB, FIG. 8). Regarding controls start-up, the installer runs through the task of starting up the VAV controls (as indicated on the start-up quality control indicator form of FIG. 7) and records the results in a manner similar to that previously noted, i.e., with the reasons for any negative answers being recorded on the form. Once the start-up quality control indicator form is completed, the appropriate completion indicator sticker from FIG. 9 is applied and completion of the start-up quality control indicator form is logged. The installer then performs testing, adjusting, and balancing, records the results on the corresponding quality control indicator form of FIG. 8, applies the appropriate completion indicator sticker when finished, and logs completion of this form.

It should be understood that in the foregoing process, while the singular term "installer" is used, multiple personnel may in fact perform any given task and different personnel may perform different tasks. For example, hanging, ductwork, and piping might be done by the same person, or could instead be performed by a carpenter, a metalworker, and a plumber, any of whom might work in conjunction with one or more assistants.

In the foregoing process, the delivery, installation, testing/start-up, and tuning process was broken down into a number of discrete tasks, and quality control indicators and completion indicators were assigned to each discrete task. In some cases, the process is difficult and/or inappropriate for discretization in this manner. For example, where piping is to be installed throughout a building, the installation might be discretized into tasks by area, with quality assurance and completion being recorded floor by floor, quadrant by quadrant, room by room, or by another scheme. However, in some cases this may be inappropriate or inexact; piping is generally not installed in this manner, and is instead generally installed by starting with major conduits and subsequently addressing branches/minor conduits, or in other orders dictated by the contractor's discretion. Therefore, discretization of certain tasks may not be useful because certain floors, quadrants, rooms, etc. may be left half-completed for a substantial period of time—an entire building may be left uncompleted until the final stages of construction—and thus completion tracking of these tasks may be virtually meaningless. Discretization might instead occur by lengths of pipe installed, e.g., quality control indicators and completion indicators could be completed every X feet of pipe, or on a similar basis, but this too may be inappropriate depending on the circumstances. It is therefore useful in some instances to make use of tracking forms which utilize continuous completion indicators, with examples being illustrated in FIGS. 10 and 11. In these tracking forms, quality control indicator forms similar to those described previously are incorporated, but they also include on the same form completion indicators which record completion status as a continuous value. When personnel work on some task and after some length of time has passed, for example every day or half-day, the quality assurance criteria listed on the forms are checked (again, with "yes/no" answers being preferred, and with reasons for negative answers being recorded). Spaces are provided wherein the installer may record completion in any appropriate form, e.g., "tasks X, Y, Z done at floor F, quadrant Q" or "floor F, quadrant Q 90% done". In essence, the task is not discretized by virtue of the degree of completion (i.e., by regarding the discrete task as being complete when it is 100% done); rather, the task is discretized by time, with a quality control indicator form being completed every time some predetermined time unit has passed. Completion logging is done by having personnel such as the construction supervisor or commissioning agent keep track of the information recorded on the completion indicator part of the forms, thereby allowing such personnel to determine whether completion has reached such a stage that other personnel may now move into the area in question to perform other tasks which cannot be (or are not efficiently) performed concurrently. While logging of continuous completion status is not as efficient as the automated completion tracking allowed by the completion indicators for discrete tasks (e.g., by the barcodes), it is nonetheless more efficient than requiring scheduling personnel to perform daily walk-throughs to ascertain whether an area is complete.

Regarding discretization of tasks and recordation of completion as a discrete or continuous value, it is noted that some (generally small) tasks are best agglomerated into a single task. As an example, when multiple lights are to be installed in a single room or hallway, the installation of each light could be regarded as a single task and a tracking form could be completed for each light. However, the installation of a single light is generally relatively simple; additionally, the scheduling of later construction rarely hinges on a single light, and rather depends on whether all lighting is completed within a given area. Thus, completion of quality control indicator forms and logging of completion indicators for each light may be burdensome, and will generate completion data which is overly detailed. It is therefore useful to define the task as consisting of the installation of all lights within the given room, hallway, or other area in question, and provide a tracking form which relates to all of these lights. This reduces the number of tracking forms and makes them easier to complete and log, and additionally provides more relevant completion data.

When the foregoing process is performed, the quality control indicator forms allow the installer to identify common problems in a more orderly and definite fashion and take corrective action where appropriate. The quality control indicator forms help prevent the installer from failing to note problems with damaged or wrong components, or components mistakenly placed for installation at the wrong location. This is opposed to the situation where components are merely "eyeballed" prior to installation, which often leads to problems not being noticed until after installation has begun or is completed. The "single responsibility" approach is implemented because the person responsible for the task in question has sole authority over installation and quality control, and if problems are later discovered with respect to a particular component, the responsible personnel can be identified with review of the quality control indicator forms. Another benefit is that the quality control indicator forms improve the quality of work by educating individual workers regarding the quality assurance criteria that are important for a successful project.

Once the tracking forms have been completed (i.e., their quality control indicator forms are completed and their completion indicator forms logged), a commissioning authority or other entity with responsibility over quality assurance may randomly sample some subset of the forms—generally 1%–10%— on a periodic basis (daily to monthly, depending upon the size and stage of a project). This allows the responsible entity to verify that the forms are being correctly completed; to verify that the information recorded thereon is an accurate representation of the status of the task which it concerns; to verify whether the building owner's project intent is being met; and to determine whether any construction problems seem apparent. If problems are found, the construction supervisor and/or individual workers can be contacted to discuss corrective measures, and to provide additional training if required. This will help prevent recurring problems, and will also help remedy problems as early as possible in the construction process to eliminate rework and scheduling problems.

Additionally, the data recorded on the quality control indicator forms can be collated and statistically analyzed by use of common statistical packages so that potential future issues in building maintenance can be identified, and future construction projects can be streamlined and improved. The data recorded on the forms are useful for developing schedules of maintenance, operations, and repair needs for the building and its system equipment/components. In addition, the data serve as a reference base for later equipment modifications, building upgrades, or change-in-use; as a means to improve design and construction management for future projects; and as sources for evaluating actual construction sub-costs. Further, use of the completion indicators allows the progress of construction to be readily ascertained, and allows planning of subsequent construction and operation tasks to be efficiently implemented with minimal lost time. If completion data is recorded frequently (preferably on a real-time basis), the current state of construction can be accurately known, which assists in better planning and coordinating of work, identification of problem areas, and avoiding disputes over the state of construction (e.g., critical path monitoring and pay requests).

A second version of a tracking form is illustrated in FIGS. 12–15, wherein FIGS. 12–14 illustrate successive pages of the tracking form wherein several quality control indicator forms are included, and FIG. 15 illustrates one completion indicator card to be used with the quality control indicator forms. A comparison of FIGS. 1–8 with FIGS. 12–14 will show that their quality control indicator forms are essentially the same, but whereas the quality control indicator forms of FIGS. 1–8 are provided separately, the quality control indicator forms of FIGS. 12–14 are combined onto one multipage form. Thus, when the quality control indicator forms of FIGS. 12–14 are used; the multipage form is used by the installer, or passed among the various personnel, who complete the indicated tasks, until all of the tasks indicated on the forms are complete. As each task is completed, the personnel who completed the task make use of completion indicator cards such as the one shown in FIG. 15, with this particular completion indicator card being used when task 3D on the quality control indicator form of FIGS. 12–14, specifically FIG. 13, is completed. The completion indicator card bears machine-readable indicia (e.g., a bar code, magnetic stripe, or raised text/figures) which can be read by machine when the task associated with the card is completed. Other completion indicator cards (not shown) are provided for tasks 1A, 2A, 2B, etc. as set forth on the quality control indicator form of FIGS. 12–14. These cards (as well as the corresponding region on the quality control indicator form) are preferably assigned different colors which each correspond to the discipline of the personnel who will perform the task to which the card relates, e.g., red for electrician, blue for carpenter, etc. The quality control indicator form is preferably provided in a plastic envelope or other container along with the completion indicator cards, and the envelope is taped or otherwise maintained in association with the component to be installed or the area to be worked upon.

Tracking forms may be provided in media other than the written media (e.g., paper) forms thus far discussed. As an example, tracking forms could be provided on notebook or palmtop computers which contain electronic versions of the quality control indicator forms and completion indicators. As work is completed on a task, an electronic version of its quality control indicator form is filled out. Its completion indicator may be downloaded periodically (e.g., daily) to a central computer, or may be linked for continuous downloading, as by wireless communication.

The foregoing discussion primarily related to the use of tracking forms during the performance of component installation tasks within a building, from the point; of component delivery to post-installation component tuning. However, it is important to note that tracking forms can also be implemented prior to or after the installation process, for example, to the planning process preceding component installation. A description of an exemplary application of the tracking forms to the building planning process will now be provided.

The use of tracking forms during the planning process is best understood by first considering how such forms are developed. The contents of planning tracking forms are preferably developed after determining the building owner's project intent (project needs and desires). The invention provides a means to track and statistically evaluate each phase of the construction process to ensure it is continuously meeting the identified needs of the owner.

Initially, project intent requirements are preferably grouped by project needs into categories such as architectural, structural, electrical, civil, mechanical, safety, energy, operations, costs, quality, productivity, schedule, financing (budgeting for in-house projects) and others. After the owner's project intent is identified, the next task in the construction project delivery is planning (also referred to as pre-design, programming or architectural programming, or briefs). For many projects, this includes developing the construction timetable and cost schedule, but other projects (especially government projects) may have budgets and timetables set when project intent is identified. It should be noted that many projects develop project intent and planning simultaneously. Although this is not optimal, this does not prevent the implementation of the invention at all following phases of project delivery. The same applies when the methods of this invention are not implemented until the construction phase.

Tracking forms can be developed for the planning phase by first identifying the tasks inherent in the planning process and then developing the appropriate tracking forms. For example, one task might be the determination of applicable safety codes, and the subsequent task might be verification that these codes apply to the building design (as it then stands). One or more tracking forms can then be developed for the tasks, preferably taking into account the owner's project intent where possible. To illustrate:

(1) The task of determining applicable safety codes could have a safety code determination tracking form which includes quality control indicators that (a) outline the various building features that may have applicable safety code requirements, e.g., exits, alarm/sprinkler systems, walkway space, and so forth; and (b) reflect any applicable items of project intent specified by the building owner, e.g., the building owner wishes to have its office building reflect the more stringent safety codes of a light industrial building. The planner can identify the code requirements of the then-current building design, and may then use the safety code determination tracking form's quality control indicators to indicate that the code requirements (and project intent) have been identified and checked. When verification is complete, the planner can use the safety code determination tracking form's completion indicator to indicate completion. The completion indicator may indicate completion status as a discrete value (e.g., all codes identified) or as a continuous value (e.g., 30% of codes identified).

(2) The planner can then proceed with code verification versus the present building design and utilize a code verification tracking form while doing so. The quality control indicators of this tracking form might (a) outline the various code requirements required for the various features/areas of the building, and (b) reflect any applicable items of project intent, e.g., the building owner wishes to have safety code requirements exceeded by 10%. After checking the then-current building design versus code requirements, the planner can use the quality control indicators to verify that the code requirements (and project intent) are being met. When verification is completed, the planner can use the completion indicators of the code verification tracking form. Again, the completion indicators may indicate completion status as a discrete value, e.g., all codes met for the fire exits on the third floor, or may indicate completion status as a continuous value, e.g., 90% safety planning verified.

Tracking forms for further planning tasks beyond safety code determination and code verification may function in a generally analogous manner. When the tracking forms for each task are completed, the commissioning authority or other quality assurance personnel can sample a limited number of items reported as complete and compare them to corresponding items of project intent identified by the owner. This provides quality feedback to ensure the planning program meets the needs of the building owner, and that the planning towards these needs does not degrade during the planning process.

Different versions of installation task tracking forms for a variable air volume (VAV) box were described earlier in this document, and as with the planning task tracking forms discussed above, it is instructive to review the development of effective tracking forms for installation tasks. After the planning process for a construction project is completed, the planner presumably has plans specifying the location of components to be installed and the specifications of each such component, and the component is generally assigned some form of identification code (e.g., VAV A4 for the variable air volume box of FIGS. 1–11). These components will often be of a standard nature and will be ordered from manufacturers (such as a VAV box); alternatively, they may be customized to the construction project at hand (such as the layout for ventilation shafts within a building, though the components of the shaft may be in whole or part off-the-shelf components). In any case, the components used in construction projects can generally be divided into families (e.g., VAV boxes, chillers, lighting, etc.), and each family tends to involve certain quality assurance data which is universal to that family, and which applies regardless of which species of component within that family is being installed. As an example, the quality control indicator forms of FIGS. 1 and 12–14 are applicable to virtually any variable air volume box in any specific construction project, though certain items of information on those quality control indicator forms may: be inapplicable to certain specific VAV boxes or projects. By constructing form/stock quality control indicator forms for each family of component, the user of the invention may come to build a library of forms which may be reused when different species within the component families are in issue, and when different construction projects are begun. Most preferably, the forms are stored on a computer so that once the planning process is done and the location and specifications of each component is known, a quality control indicator form may be generated for each component and may be easily customized to that specific component. Alternatively, for each component, the generic quality control indicator form for that component's family may be used and the relevant items of information on the form may simply be struck out when inapplicable. Completion indicators for each component may then be generated, as by generating separate completion indicator stickers (FIG. 9) or completion indicator cards (FIG. 15), or by incorporating appropriate completion indicator forms directly onto the quality control indicator forms (as in FIGS. 10–11).

When developing an installation task tracking form for any given component, it is useful to consider factors such as project intent, basis of design, equipment submittal (i.e., the specifications for which the component was ordered), and the manufacturer's installation and operation information. Elements of an installation task tracking form can include:

Documentation check: A documentation check may be used to ensure that all of the information required to properly install and operate the piece of equipment has been received. Where tracking forms incorporate a documentation check, the quality control indicator may account for information such as the manufacturer's "cut sheets" (the manufacturer's or vendor's performance data for a component); startup plan; sequence of controls and control strategies; operation and maintenance manuals; and schematics showing installation details.

Model verification: Model verification can be performed to ensure that the proper component model is installed. The quality control indicator form preferably records key information on the identity and specifications of the equipment. As an example, for a variable air volume (VAV) box, this includes information on the manufacturer, model, airflow (maximum and minimum), serial number, inlet diameter, heating capacity, fan power, and total static pressure.

Pre-installation checks: Apart from model verification, it is useful to have the quality control indicator form account for information on the condition of the component. Preferably, once the component arrives on site, its condition is recorded in the quality control indicator form. Discrepancies (e.g., an apparently damaged component) can be addressed immediately by the individual worker and field supervisor. As an example, for a VAV box, the quality control indicator form preferably records information such as whether the VAV and its packaging appear damaged; whether the air openings to the box are sealed; whether the airflow sensing tubing is plugged; whether the local electrical disconnect is in the proper location; whether the enclosure for the DDC (direct digital control) control panel is in the proper location; whether the grommets for the airflow sensing tubing are secure; and whether unit tags are affixed. It is also helpful to verify whether the mnanufacturer's ratings are readable and whether they appear suitable for the installation location for the component. The pre-installation checks are preferably recorded in the quality control indicator form as binary values (i.e., Yes/No) for ease of recordation by the responsible personnel.

Installation checks: The quality control indicator form preferably identifies the key installation tasks for the component so that installing personnel may review and verify these tasks. For example, a VAV box may have the key installation tasks of hanging the box, installing ductwork at the air inlet(s), installing ductwork at the outlet, installing hot water piping, installing wiring, controls installation, and tuning (testing, assessing, and balancing).

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A method of tracking building construction timing and quality comprising:
   a. determining tasks requiring completion during a building construction project;
   b. constructing at least one tacking form for the tasks, wherein each tracking form includes:
      i. at least one quality control indicator form wherein quality standards for one of the tasks are listed, the quality standards being optional for completion of the task but affecting the quality of the task's completion, and
      ii. at least one completion indicator allowing recordation of the completion status of one of the tasks, each completion indicator corresponding to one quality control indicator form;
   c. while completing each task, completing the tracking form by:
      i. verifying whether the quality standards listed on the task's quality control indicator form are met, and
      ii. recording the completion status of the task using the task's completion indicator;
   d. at least periodically:
      i. compiling the completion status for the tasks, thereby obtaining a measure of the degree of completion of the building construction project; and
      ii. reviewing at least some of the tasks' quality cool indicator forms versus the building construction project, thereby obtaining a measure of the degree of adherence to the quality standards listed thereon.

2. The method of claim 1 wherein the step of verifying whether the quality standards listed on task's quality control indicator form are met includes:
   a. recording adherence to the task's listed quality control standards as a binary value on the tasks quality control indicator form, with the value reflecting adherence or non-adherence; and
   b. recording reasons for non-adherence to the task's listed quality control standards on the task's quality control indicator form.

3. The method of claim 2 wherein the step of reviewing at least some of the task's quality control indicator forms verses the building construction project includes:
   a. sampling only some of the quality control indicator forms; and
   b. statistically analyzing the sampled quality control indicator forms for adherence and reasons for non-adherence to listed quality control standards.

4. The method of claim 1 wherein the completion indicators include:
   a. binary completion indicators wherein the completion status of the corresponding task is recorded as incomplete or complete; and
   b. continous completion indicators wherein the completion status of the corresponding task is recorded as a value ranging between incomplete and complete.

5. The method of claim 1 wherein at least some tasks have corresponding completion indicators which include machine-readable indicia, and wherein the recordation of the completion status of each of the tasks is performed by mechanically reading the machine-readable indicia of its completion indicator once the task is completed.

6. The method of claim 5 wherein the machine readable indicia encode information designating the completion of their corresponding tasks.

7. The method of claim 5 wherein the completion indicators which include machine-readable indicia are provided on the quality control indicator forms to which these completion indicators correspond.

8. The method of claim 5 wherein the completion indicators which include machine-readable indicia are adhesively attachable to the quality control indicator forms to which these completion indicators correspond.

9. The method of claim 5 wherein the completion indicators which include machine-readable indicia are provided on cards separate from the quality control indicator forms to which these completion indicators correspond, and wherein each card is associated with its corresponding quality control indicator form in a container.

10. The method of clam wherein the completion indicators are provided on their corresponding quality control indicator forms.

11. The method of claim 1 wherein the quality control indicator forms are assembled from a library of stock quality control indicator forms.

12. The method of claim 1 wherein the binding construction project includes design, construction, and start-up phases, and wherein tracking forms are completed during each phase.

13. The method of claim 1 wherein completion status is recorded after verifying whether the quality standards listed on the task's quality control indictor form are met.

14. The method of claim 1 wherein the quality standards are not each associated with a respective completion indicator.

15. A method of tracking building construction timing and quality comprising:
   a. determining tasks requiring completion during a building construction project;
   b. constructing at least one tracking form for the tasks, wherein each tracing form includes for each task:
      i. at least one quality control indicator form listing quality standards for the completion of the task, the quality standards being optional for completion of the task but affecting the quality of the task's completion;
      ii. at least one completion indicator for the task, wherein the completion indicator bears machine-readable indicia encoding the completion status of the, task;
   wherein the quality standards are not each associated with their own respective completion indicators;
   c. while completing each task;
      i. recording on the task's quality control indicator form whether the quality standards listed thereon are met;
      ii. if the quality standards listed thereon are not met, recording the task's quality control indicator form the reasons why;
      iii. recording the completion status of the task using the task's completion indicator;
   d. at least periodically:
      i. compiling the tasks' completion status, thereby obtaining a measure of the degree of completion of the building construction project; and
      ii. reviewing at least some of the tasks' quality control indicator forms versus the corresponding completed tasks within the building construction project, thereby obtaining a measure of the degree of adherence to the quality standards listed on the quality control indicator forms, wherein the building construction project includes a construction phase wherein building components are installed, and wherein at least some of the building components have tracking forms physically attached prior to their installation, with these tracking forms including quality control indicator forms and completion indicators relating to tasks performed during installation.

16. The method of claim 15 wherein one or more completion indicators are provided on their corresponding quality control indicator forms.

17. The method of claim 15 wherein:
 a. one or more completion indicators are provided as adhesive stickers whereupon their machine-readable indicia are provided, and
 b. the completion indicators provided as adhesive stickers are adhered to their corresponding quality control indicator forms prior to recording the completion status of their corresponding tasks.

18. The method of claim 15 wherein the quality control indicator forms am assembled from a library of stock quality control indicator forms.

19. The method of claim 15 wherein the step of recording the completion status of the task is performed after recording on the task's quality control indicator form whether the quality standards listed thereon are met.

20. A method of tracking building construction timing and quality comprising:
 a. determining the tasks requiring completion during a building construction project;
 b. constructing a tracking form for each task, wherein each tracking form includes at least one quality control indicator form having thereon:
  i. one or more completion indicators for the task, wherein the completion indicator bears machine-readable indica encoding the completion status of the task;
  ii. one or more steps required for proper completion of the task;
  iii. quality standards for each step, wherein the quality standards do not each have associated completion indicators;
 c. while completing each task,
  i. recording on the task's quality control indicator form whether the quality standards listed thereon are met;
  iii. subsequently recording the completion status of the task using the task's completion indicator;
 d. at least periodically:
  i. compiling the tasks' completion status, thereby obtaining a measure of the degree of completion of the building construction project; and
  ii. reviewing at least some of the tasks' quality control indicator forms versus the corresponding completed tasks within the building construction project, thereby obtaining a measure of the degree of adherence to the quality standards listed on the quality indicator forms, wherein the building construction project includes a construction phase wherein building components are installed, and wherein at least some of the building components have tracking forms physically attached prior to their installation, with these tracking forms including quality control indicator forms and completion indicators relating to tasks performed during installation.

* * * * *

UNITED STATES PATENT AND TRADEMARK OFFICE
CERTIFICATE OF CORRECTION

PATENT NO. : 6,842,760 B1
DATED : January 11, 2005
INVENTOR(S) : Dorgan et al.

It is certified that error appears in the above-identified patent and that said Letters Patent is hereby corrected as shown below:

Column 17,
Line 11, delete "tacking" and substitute therefor -- tracking --.
Line 33, delete "cool" and substitute therefor -- control --.
Line 36, delete "." and substitute therefor -- ; --
After line 36 insert as a new paragraph: -- wherein the building construction project includes a construction phase wherein building components are installed, and wherein at least some of the building components have tracking forms physically attached prior to their installation, with these tracking forms including quality control indicator forms and completion indicators relating to tasks performed during installation. --.

Column 18,
Line 3, delete "machine readable" and substitute therefor -- machine-readable --.
Line 20, delete "clam" and substitute therefor -- claim 1 --.
Line 41, delete "tracing" and substitute therefor -- tracking --.
Line 51, delete "," between the words "the" and "task".

Signed and Sealed this

Twenty-ninth Day of March, 2005

JON W. DUDAS
*Director of the United States Patent and Trademark Office*